US012570213B2

(12) United States Patent
Woo et al.

(10) Patent No.: US 12,570,213 B2
(45) Date of Patent: Mar. 10, 2026

(54) SYSTEM AND METHOD FOR NOTIFYING PASSENGERS OF NEARBY OBJECTS

(71) Applicant: GM Global Technology Operations LLC, Detroit, MI (US)

(72) Inventors: Sunggeun Woo, Bucheon (KR); Taewon Lee, Seoul (KR)

(73) Assignee: GM Global Technology Operations LLC, Detroit, MI (US)

( * ) Notice: Subject to any disclaimer, the term of this patent is extended or adjusted under 35 U.S.C. 154(b) by 64 days.

(21) Appl. No.: 18/603,893

(22) Filed: Mar. 13, 2024

(65) Prior Publication Data

US 2025/0289366 A1      Sep. 18, 2025

(51) Int. Cl.
B60Q 9/00                (2006.01)
(52) U.S. Cl.
CPC .................................... B60Q 9/008 (2013.01)
(58) Field of Classification Search
None
See application file for complete search history.

(56) References Cited

U.S. PATENT DOCUMENTS

| | | | | | |
|---|---|---|---|---|---|
| 7,978,056 | B2 * | 7/2011 | Mercurio | ................. | B60Q 3/80 |
| | | | | | 340/426.14 |
| 10,259,383 | B1 * | 4/2019 | Campbell | ............. | G06V 20/56 |
| 11,614,340 | B2 * | 3/2023 | Kim | ....................... | G06Q 10/04 |
| | | | | | 702/104 |
| 11,878,718 | B2 * | 1/2024 | Somanath | ............. | B60W 40/02 |
| 2010/0260371 | A1 * | 10/2010 | Afshar | ..................... | H04R 7/24 |
| | | | | | 340/407.1 |
| 2014/0309884 | A1 * | 10/2014 | Wolf | .................... | G05D 1/0214 |
| | | | | | 701/41 |
| 2015/0300046 | A1 * | 10/2015 | Lange | .................... | B60R 21/02 |
| | | | | | 701/49 |
| 2016/0372103 | A1 * | 12/2016 | Jung | .................... | H04R 1/1083 |
| 2017/0316718 | A1 * | 11/2017 | Hughes | ............... | H04M 19/047 |
| 2020/0236461 | A1 * | 7/2020 | Hall | ........................ | G06F 3/016 |
| 2021/0086726 | A1 * | 3/2021 | Hassani | ................ | B60Q 1/549 |
| 2023/0058007 | A1 * | 2/2023 | Somanath | ....... | B60W 60/00253 |
| 2024/0144819 | A1 * | 5/2024 | Kuehner | ............. | G08G 1/0967 |
| 2025/0037553 | A1 * | 1/2025 | Palmer | ................... | G06F 3/016 |

* cited by examiner

*Primary Examiner* — Muhammad Adnan

(74) *Attorney, Agent, or Firm* — Honigman LLP; Matthew H. Szalach; Jonathan P. O'Brien

(57) ABSTRACT

A computer-implemented method that, when executed by data processing hardware, causes the data processing hardware to perform operations comprising obtaining sensor data from a vehicle sensor system of a vehicle, determining whether an object is approaching a rear end of the vehicle based on the sensor data, determining whether the vehicle is at rest based on the sensor data, and emitting a tactile alert through an audio system if the object is detected and the vehicle is at rest.

20 Claims, 5 Drawing Sheets

SYSTEM AND METHOD FOR NOTIFYING PASSENGERS OF NEARBY OBJECTS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for providing passenger exit assistance and, more particularly, to a system and method for providing passenger exit assistance via an audio system of a vehicle.

In general, vehicles may be equipped with passenger assistance systems for identifying nearby vehicles or pedestrians and notifying one or more passengers of the same. Some passenger assistance systems may provide a visual or auditory alert to notify passengers of nearby vehicles or pedestrians while the vehicle is in motion and/or while the vehicle is at rest (i.e., in a park mode), for example. It may be desirable to identify nearby vehicles or pedestrians and notify passengers in another manner using one or more existing systems of the vehicle (i.e., without having to install additional hardware).

SUMMARY

One aspect of the disclosure provides a computer-implemented method that, when executed by data processing hardware, causes the data processing hardware to perform operations. The operations include obtaining sensor data from a vehicle sensor system of a vehicle, determining whether an object is approaching a rear end of the vehicle based on the sensor data, determining whether the vehicle is at rest based on the sensor data, and emitting a tactile alert through an audio system if the object is detected and the vehicle is at rest.

Implementations of the disclosure may include one or more of the following optional features. For example, obtaining sensor data from the vehicle sensor system may further include obtaining data from one or more camera sensors of an exterior sensor subsystem.

In at least one example, obtaining sensor data from the vehicle sensor system may further include obtaining data from one or more radar sensors of an exterior sensor subsystem.

According to another example, obtaining sensor data from the vehicle sensor system may further include obtaining data from one or more wheel speed sensors of an exterior sensor subsystem. Determining whether the vehicle is at rest may further include determining whether the one or more wheel speed sensors indicate that the vehicle is idling.

According to at least one aspect, determining whether the vehicle is at rest may further include determining whether an engine control module indicates that the vehicle is in a park mode.

According to another aspect, emitting the tactile alert through the audio system provides a haptic effect for one or more passengers of the vehicle.

According to one example, emitting the tactile alert through the audio system may further include emitting sound from one or more speakers in communication with the audio system at a frequency greater than 5 Hz and less than 20 Hz.

According to another example, emitting the tactile alert through the audio system may further include selectively emitting the tactile alert through driver side or co-pilot side speakers in communication with the audio system depending on which side of the vehicle the object is detected.

According to at least one aspect, the method may further include providing a visual alert using an interior lighting system.

Another aspect of the disclosure provides a vehicle management system including a computing system comprising data processing hardware and memory hardware in communication with the data processing hardware. The vehicle management system further includes a vehicle sensor system in communication with the computing system, a body control module in communication with the computing system, and an audio system in communication with the computing system. The memory hardware storing instructions that, when executed on the data processing hardware, cause the data processing hardware to perform operations including obtaining sensor data from the vehicle sensor system, determining whether an object is approaching a rear end of the vehicle based on the sensor data, determining whether the vehicle is at rest based on the sensor data, and emitting a tactile alert through the audio system if the object is detected and the vehicle is at rest.

Implementations of the disclosure may include one or more of the following optional features. For example, obtaining sensor data from the vehicle sensor system may further include obtaining data from one or more camera sensors of an exterior sensor subsystem.

According to at least one example, obtaining sensor data from the vehicle sensor system may further include obtaining data from one or more radar sensors of an exterior sensor subsystem.

According to another example, obtaining sensor data from the vehicle sensor system may further include obtaining data from one or more wheel speed sensors of an exterior sensor subsystem. Determining whether the vehicle is at rest may further include determining whether the one or more wheel speed sensors indicate that the vehicle is idling.

According to at least one aspect, determining whether the vehicle is at rest may further include determining whether an engine control module indicates that the vehicle is in a park mode.

According to another aspect, emitting the tactile alert through the audio system may provide a haptic effect for one or more passengers of the vehicle.

According to at least one example, emitting the tactile alert through the audio system may further include emitting sound from one or more speakers in communication with the audio system at a frequency greater than 5 Hz and less than 20 Hz.

According to another example, emitting the tactile alert through the audio system may further include selectively emitting the tactile alert through driver side or co-pilot side speakers in communication with the audio system depending on which side of the vehicle the object is detected.

According to at least one example, the vehicle management system further includes providing a visual alert using an interior lighting system.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figure 1:
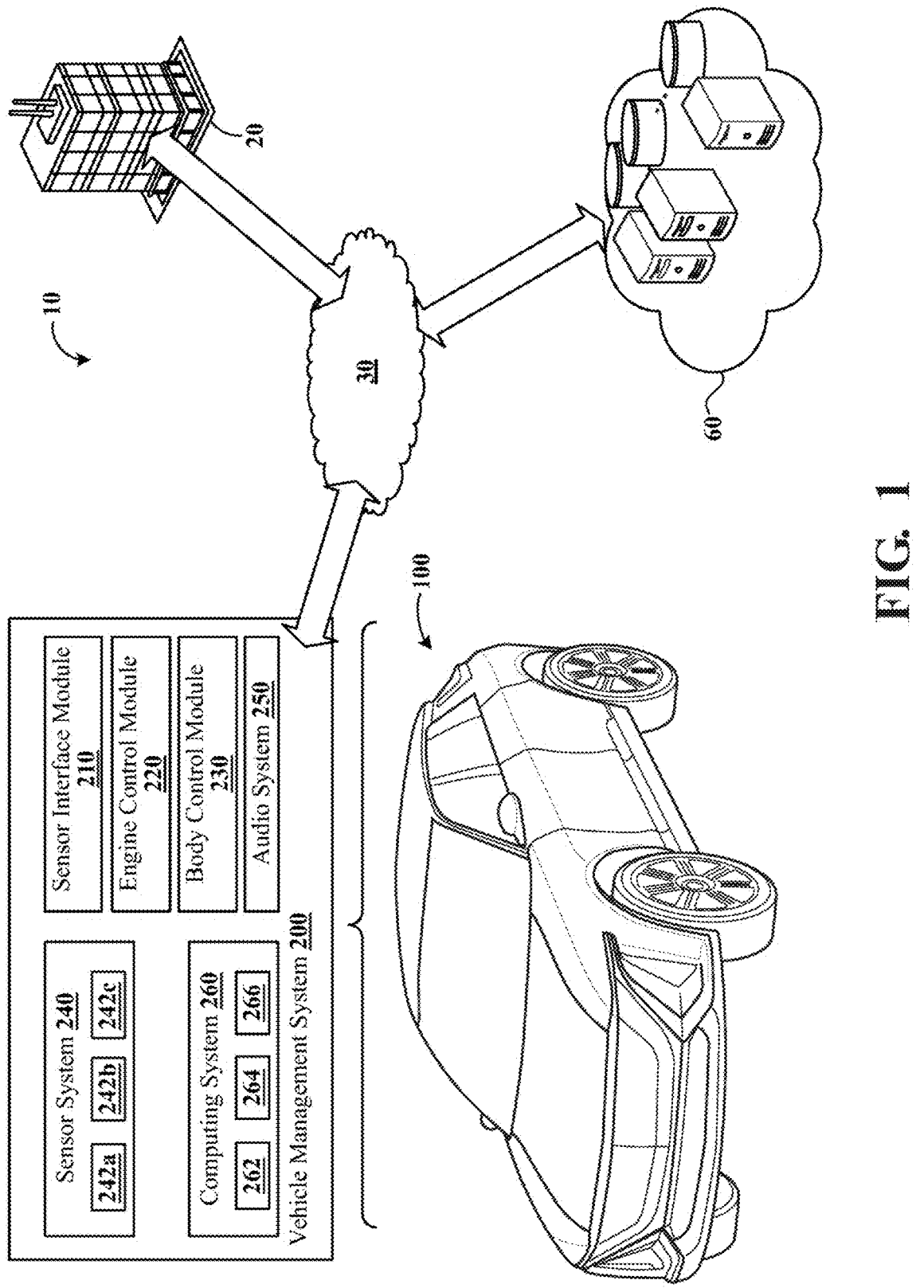
FIG. 1 is a schematic diagram of a vehicle environment including a vehicle management system according to principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below; the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Referring to FIG. 1, an example vehicle operating environment 10 is provided for illustration of the principles of the present disclosure. The vehicle operating environment 10 includes a vehicle 100 and a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 30 (e.g., the Internet, cellular networks).

Figure 2:
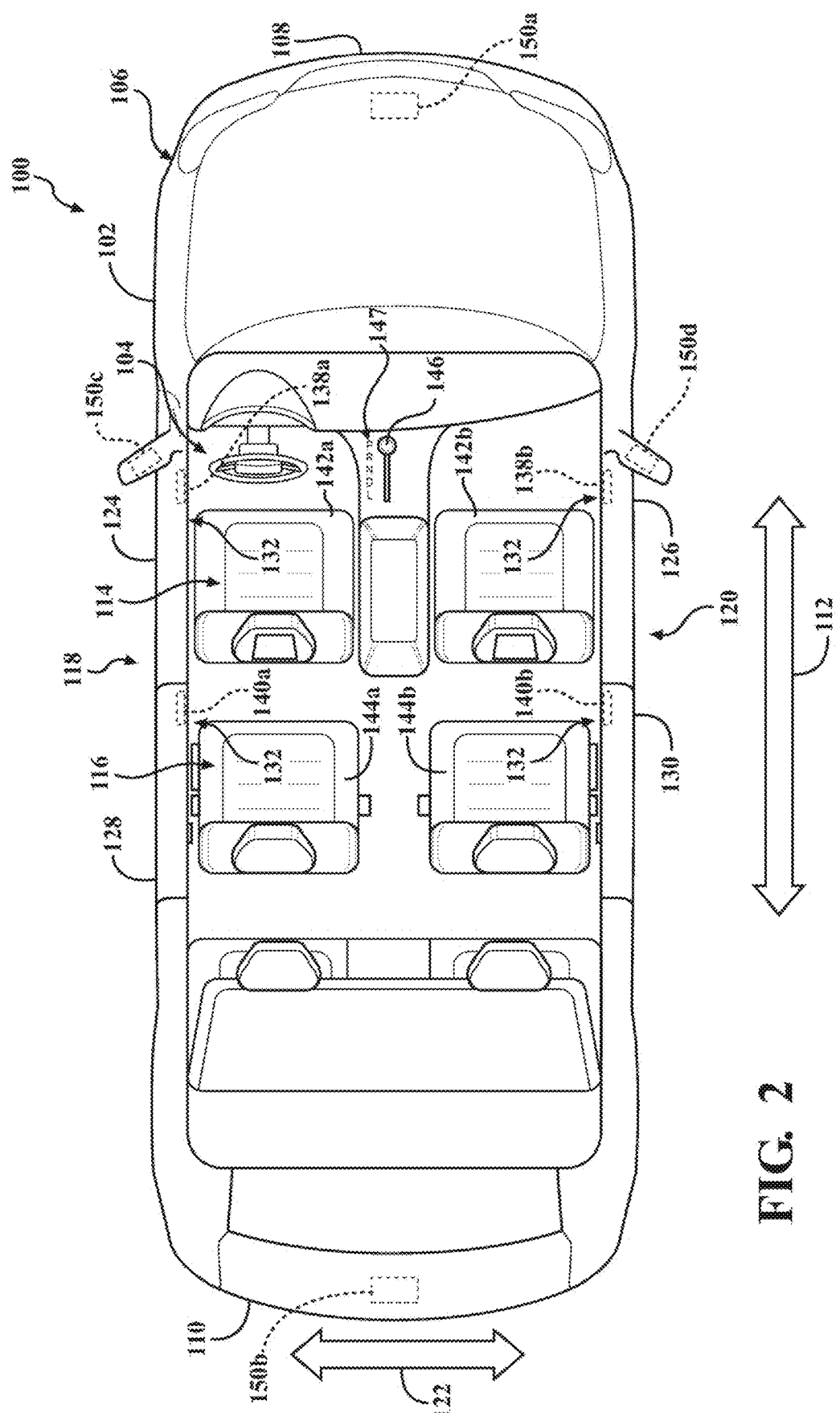
FIG. 2 is cross-sectional view of the vehicle of FIG. 1 showing a portion of an interior of the vehicle.

With reference to FIG. 2, the vehicle 100 can have a vehicle body 102, which has a vehicle interior 104 and a vehicle exterior 106. The vehicle body 102 has a first or front end 108 spaced fore-aft from a second or rear end 110 with respect to a longitudinal axis 112. The vehicle 100 has a first or front passenger compartment 114 near the front end 108 and a second or rear passenger compartment 116 spaced fore-aft from the front passenger compartment 114 toward the rear end 110. In this example, the front passenger compartment 114 and the rear passenger compartment 116 each have a first or driver side 118 and a second or co-pilot side 120 spaced cross-car from the driver side 118 with respect to a lateral axis 122. The lateral axis 122 is perpendicular to the longitudinal axis 112. The driver and co-pilot sides 118, 120 may be on different sides (i.e., left or right) depending on the region of the world for which the vehicle 100 is manufactured. For the purposes of the present disclosure, the driver side 118 is on the left side and the co-pilot side 120 is on the right side of the vehicle 100 with respect to the lateral axis 122. Note, the present disclosure equally applies to vehicles where the driver side is on the right side of the vehicle and the co-pilot side is on the left side of the vehicle.

Figure 3:
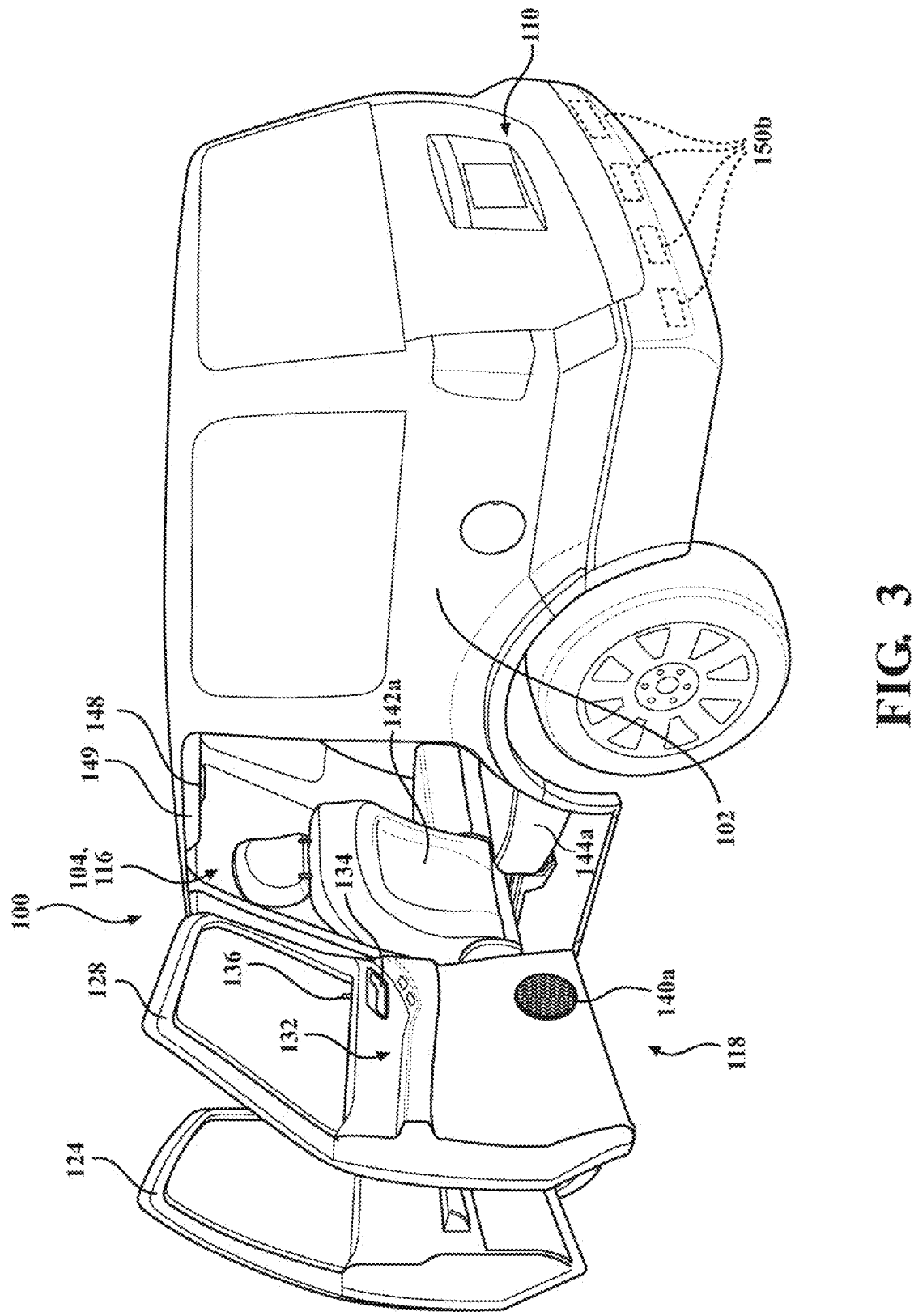
FIG. 3 is a rear perspective view of the vehicle of FIG. 1 showing a front left passenger compartment door and a rear left passenger compartment door both in an open position.
Figure 4:
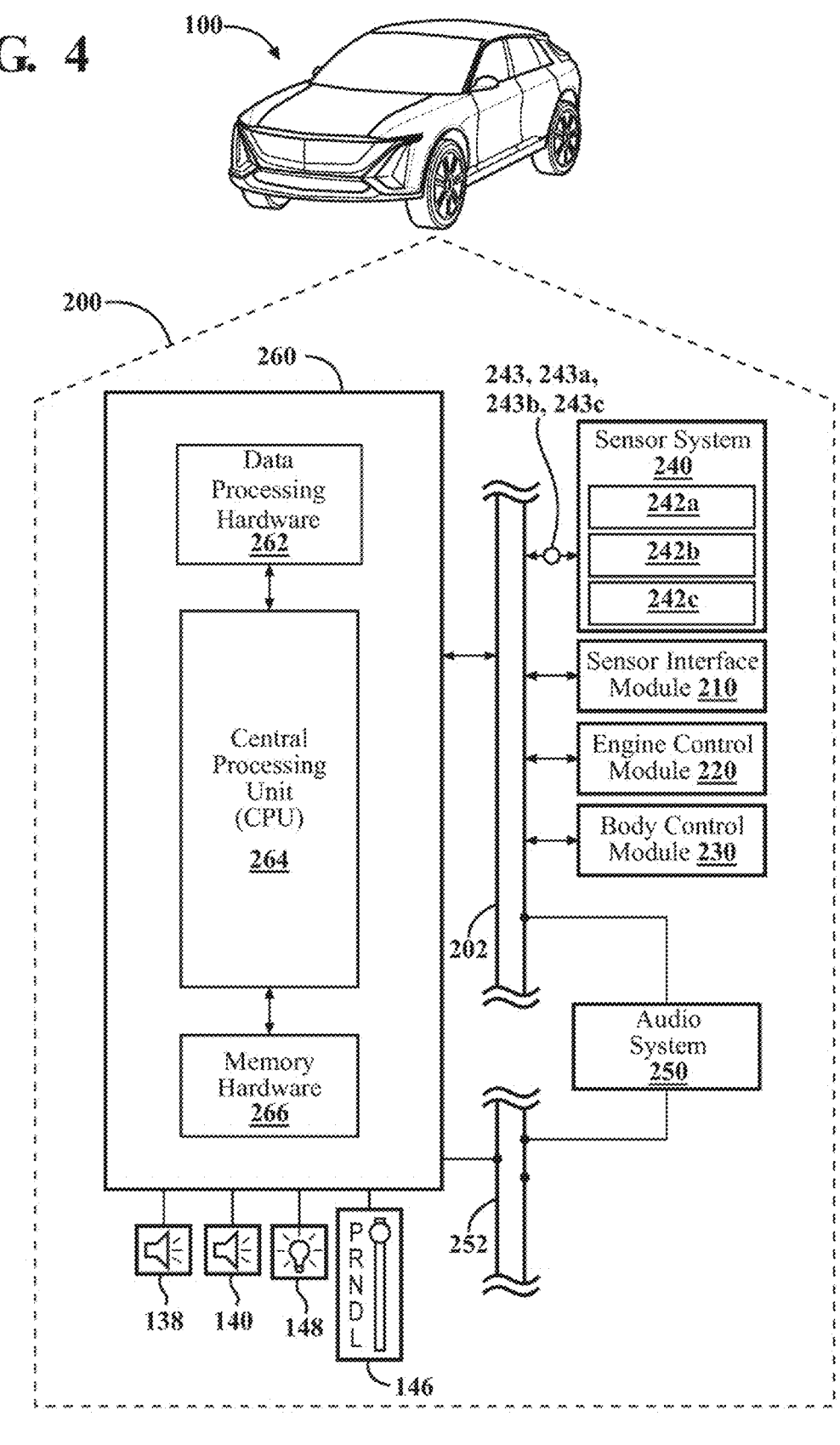
FIG. 4 is an enlarged schematic diagram showing an example of the vehicle management system of FIG. 1 according to the principles of the present disclosure.

With continued reference to FIG. 2, one or more closures (e.g., doors, tailgate, etc.) may be coupled to the vehicle body 102 of the vehicle 100. For instance, a front left passenger compartment door 124 and a front right passenger compartment door 126 may be coupled to the vehicle body 102 to enclose the front passenger compartment 114. Likewise, a rear left passenger compartment door 128 and a rear right passenger compartment door 130 may be coupled to the vehicle body 102 to enclose the rear passenger compartment 116. The front passenger compartment doors 124, 126 and the rear passenger compartment doors 128, 130 may each have an interior door trim 132, which can include one or more door handles 134 (FIG. 3), a door lock 136 (FIG. 3), and one or more speakers. The one or more speakers may include front passenger compartment speakers 138, such as a front left speaker 138a arranged in the interior door trim 132 of the front left passenger compartment door 124 and a front right speaker 138b arranged in the interior door trim 132 of the front right passenger compartment door 126, as shown in FIGS. 2 and 3. Additionally or alternatively, the one or more speakers may include rear passenger compartment speakers 140, such as a rear left speaker 140a arranged in the interior door trim 132 of the rear left passenger compartment door 128 and a rear right speaker 140b arranged in the interior door trim 132 of the rear right passenger compartment door 130.

The front passenger compartment 114 may have one or more front seats 142, such as a first or front left seat 142a and a second or front right seat 142b. The front left seat 142a may be arranged adjacent to the front left speaker 138a and the front right seat 142b may be arranged adjacent the front right speaker 138b. The rear passenger compartment 116 may have one or more rear seats 144, such as a third or rear left seat 144a arranged fore-aft of the front left seat 142a and a fourth or rear right seat 144b arranged fore-aft of the front right seat 142b. The rear left seat 144a may be arranged adjacent the rear left speaker 140a and the rear right seat 144b may be arranged adjacent the rear right speaker 140b. Additional speakers may be arranged throughout the vehicle 100 as well.

With continued reference to FIG. 2, a shifter 146 may be arranged cross-car between the front left seat 142a and the front right seat 142b so that an operator of the vehicle 100 can change a gear status 147 (i.e., park, reverse, neutral, drive, low) of the vehicle 100.

With reference again to FIG. 3, the vehicle interior 104 may include interior lighting 148 arranged on a roof panel 149 above the front and rear seats 142, 144. In at least one example, the interior lighting 148 is arranged within the vehicle interior 104 so that one or more passengers can perceive light in the event the interior lighting 148 is illuminated.

The vehicle 100 may include one or more sensors (e.g., cameras, radars, wheel speed sensors, etc.) 150 arranged on or within the vehicle body 102, as shown in FIG. 1. For instance, a first or front sensor 150a may be arranged on the front end 108 (e.g., on a grille of the vehicle), a second or rear sensor 150b may be arranged on the rear end 110 (e.g., on a tailgate and/or rear bumper of the vehicle 100), a third or left sensor 150c may be arranged on the driver side 118 (e.g., on a driver side mirror), and a fourth or right sensor 150d may be arranged on the co-pilot side 120 (e.g., on a co-pilot side mirror). The one or more sensors 150, 150a-150d may be configured to detect objects approaching the vehicle 100. More specifically, for example, the rear sensor 150b, the left sensor 150c, and the right sensor 150d can be arranged and configured to detect objects approaching the rear end 110 of the vehicle 100. If, for instance, a second vehicle is traveling in a lane that is adjacent to the position of the vehicle 100 and approaching the rear end 110 of the vehicle 100, the rear sensor 150b, the left sensor 150c, and/or the right sensor 150d can detect the second vehicle. Additional sensors (e.g., wheel speed sensors) may arranged in or on the vehicle 100 so that a wheel speed of the vehicle 100 may be determined as well (i.e., configured to determine if the vehicle 100 is at rest or not).

With reference to FIGS. 1 and 3, the vehicle 100 may be equipped with a vehicle management system 200 (e.g., a telematics unit). A network connection interface 202 may be communicatively coupled to the vehicle management system 200. Some examples of the network connection interface 202 may include a twisted pair/fiber optic Ethernet switch, an internal/external parallel communication bus, a local area network (LAN) interface, a controller area network (CAN), a media-oriented system transfer (MOST), a local interconnection network (LIN) interface, and the like. Other communication interfaces may also include those that conform with ISO, SAE, and IEEE standards and specifications. The network connection interface 202 enables components of the vehicle management system 200 to send and receive signals with each other and with various systems and subsystems both within or "resident" to the vehicle body 102 and outside or "remote" from the vehicle body 102. The vehicle management system 200 can receive and/or transmit data to/from one or more electronic control units (ECUs) such as a sensor interface module 210, an engine control module 220, and/or a body control module 230. The vehicle management system 200 may also communicate with additional ECUs such as a powertrain control module (PCM), a transmission control module, a brake system control module (BSCM), a climate control module (CCM), etc.

The vehicle management system also includes a sensor system 240 that can communicate with the network connection interface 202 directly or via the sensor interface module 210, as shown in FIG. 3. While the vehicle 100 maneuvers about the environment 10 or is at rest within the environment 10, the sensor system 240 includes various sensor subsystems 242, 242a, 242b, 242c configured to gather sensor data relating to characteristics of the environment 10 and/or status of the vehicle 100. For instance, the sensor system 240 may include a vehicle exterior sensor subsystem 242a configured to measure or obtain external environmental data 243a, such as surrounding objects (e.g., vehicles, bikes, pedestrians, etc.). According to one aspect of the present disclosure, the one or more sensors 150, 150a-150d are coupled to or otherwise in communication with the exterior sensor subsystem 242a. Additionally, the sensor system 240) also includes an interior sensor subsystem 242b configured to measure or obtain interior environmental data 243b, such as vehicle occupancy and/or a vehicle status sensor subsystem 242c configured to measure or obtain vehicle operating data 243c, such as vehicle location and operating parameters.

With continued reference to FIG. 3, an audio system 250 can be operatively connected to the network connection interface 202 and an audio bus 252 to receive analog information, rendering it as sound, via one or more speaker components (discussed in more detail below). The network connection interface 202 and the audio bus 252 may be operatively coupled to a computing system 260, such as an onboard computing device that provides several functions, both individually and through its communication with other networked devices. For instance, the computing system 260 can wirelessly communicate (e.g., via cell towers, base stations, and/or mobile switching centers (MSCs), etc.) with a remotely located or off board cloud computing system 60 (FIG. 1) via the network 30. The computing system 260 is generally composed of data processing hardware 262, each of which may be embodied as a discrete microprocessor, an application specific integrated circuit (ASIC), or a dedicated control module. The vehicle 100 may offer centralized vehicle control via a central processing unit (CPU) 264 that is operatively coupled to memory hardware 266, each of which may take on the form of a CD-ROM, magnetic disk, IC device, semiconductor memory (e.g., various types of RAM or ROM), etc., and a real-time clock (RTC).

The CPU 264 may receive data from one or more sensing devices that use, for example, photo detection, radar, laser, ultrasonic, optical, infrared, or other suitable technology for object detection. In accordance with the present illustrative configuration, the one or more sensors 150 of the vehicle

100 may be equipped with one or more digital cameras, one or more range sensors, one or more vehicle speed sensors, one or more vehicle dynamics sensors, and any requisite filtering classification, fusion and analysis hardware and software for processing raw sensor data. The digital camera may use a charge coupled device (CCD) sensor or other suitable optical sensor to generate images indicating a field-of-view of the vehicle 100, and may be configured for continuous image generation (e.g., at least about 35 images generated per second). The range sensor may emit and detect reflected radio, electromagnetic, or light-based waves (e.g., radar, EM inductive, Light Detection and Ranging (LIDAR), etc.) to detect, for example, the presence, geometric dimensions, and/or proximity of an object. The vehicle wheel speed sensors may include, for example, wheel speed sensors that measure wheel speed, which are then used to determine real-time vehicle speed. Data received by the CPU 264 from the one or more sensors 150 may be utilized by the CPU 264 to identify objects within a detectable range of the vehicle 100.

These sensors are distributed throughout the vehicle 100 in operatively unobstructed positions relative to respective views fore or aft or cross-car of the vehicle 100. Each sensor generates electrical signals indicative of a characteristic or condition of a targeted object, generally as an estimate with a corresponding standard deviation. While the operating characteristics of these sensors are generally complementary, some are more reliable in estimating certain parameters than others. Most sensors have different operating ranges and areas of coverage, and are capable of detecting different parameters within their operating range. For instance, a radar-based sensor may estimate range, range rate, and azimuth location of an object, but may not be robust in estimating the extent of a detected object. Cameras with optics processing, on the other hand, may be more robust in estimating a shape and azimuth position of an object, but may be less efficient at estimating the range and range rate of the object. A scanning-type LIDAR-based sensor may perform efficiently and accurately with respect to estimating range and azimuth position, but may be unable to accurately estimate range rate and, thus, may not be accurate with respect to new object acquisition/recognition. Ultrasonic sensors, by comparison, are capable of estimating range but are generally unable to accurately estimate range rate and azimuth position. Further, the performance of many sensor technologies may be affected by differing environmental conditions. Consequently, sensors generally present parametric variances whose operative overlap offer opportunities for sensory fusion.

According to another aspect of the present disclosure, the front speakers 138 and rear speakers 140 may be coupled to or otherwise in communication with the computer system 260 and communicate with the audio system 250 via the audio bus 252. Additionally or alternatively, the interior lighting 148 may be coupled to or otherwise in communication with the computer system 260 in a manner that the interior lighting 148 can be illuminated if one or more parameters are satisfied, for example. Also, the shifter 146 may be coupled to the computer system 260) and/or to the engine control module 220 such that the gear status 147 (i.e., park, reverse, neutral, drive, low) of the vehicle 100 may be controlled by an operator of the vehicle 100.

Figure 5:
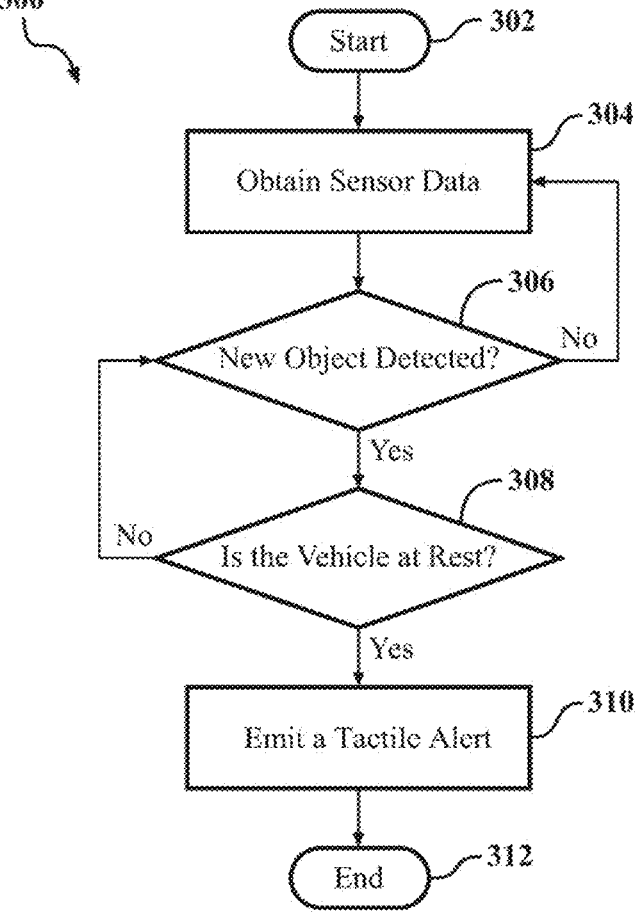
FIG. 5 is a flow diagram showing operations of the vehicle management system of FIG. 4.

According to the principles of the present disclosure, a method 300 is provided for notifying one or more passengers that one or more objects are nearby the vehicle 100. More specifically, the method 300 may be configured so that passengers are notified when an object is approaching the rear end 110 of the vehicle 100 when the vehicle 100 is at rest, which may be desirable to alert one or more passengers so that the passengers can exit the vehicle 100 once the object has passed the vehicle 100. The method 300 will be discussed in greater detail below with reference to FIG. 5.

At 302, the method 300 is initiated. In practical terms, at 302 the method 300 may be initiated upon powering up of the vehicle 100 by the vehicle operator.

At 304, the sensor system 240 begins collecting sensor data 243 from one or more of the exterior sensor subsystem 242*a*, the interior sensor subsystem 242*b*, and/or the vehicle status sensor subsystem 242*c*. According to at least one aspect, the one or more sensors 150 of the exterior sensor subsystem 242*a* may obtain data concerning the one or more operating parameters and the surroundings of the vehicle 100.

At 306, the sensor data 243 may be utilized by at least the computer system 260 to determine whether an object (e.g., pedestrian, vehicle, etc.) is approaching the vehicle 100. More particularly, whether an object is approaching the rear end 110 of the vehicle 100. If the computer system 260 determines that an object is approaching the vehicle 100, the method 300 can proceed to 308. If the computer system determines that no object is approaching the vehicle 100, the method 300 can return to 304 where sensor data 243 can be continuously gathered.

At 308, if the vehicle 100 is at rest, the method 300 can proceed to 310. According to one aspect, the vehicle 100 is at rest if the wheel speed is zero (0) miles per hour (MPH) or zero (0) kilometers per hour (KPH) (i.e., the vehicle 100 is idling). This may be determined by assessing data gathered by one or more of the sensors 150 (e.g., a wheel speed sensor) of the exterior sensor subsystem 242*a*, for example. Additionally or alternatively, the vehicle 100 can be considered at rest if the gear status 147 indicates that the vehicle 100 is in a park position. In other words, if the shifter 146 is in a park position then the vehicle 100 is considered to be at rest. The engine control module 220 may continuously communicate the gear status 147 of the vehicle 100 to the computer system 260, for example. If the vehicle 100 is not at rest, then the method 300 can return to 306 to determine whether an object is approaching the vehicle 100.

At 310, the audio system 250 can control one or more of the front and/or the rear speakers 138, 140 and selectively emit a tactile alert throughout the vehicle interior 104. The tactile alert can be a low frequency noise emitted from one or more speakers 138, 140 which provides a haptic effect that can be felt by one or more passengers of the vehicle 100. The tactile alert may be desirable to notify one or more of the passengers that an object is approaching the vehicle 100. In at least one example, the tactile alert may be desirable so that the one or more passengers can avoid opening one of the passenger compartment doors 124, 126, 128, 130 while an object is approaching the vehicle 100. According to another aspect, additional hardware is not required to provide the tactile alert, rather, existing audio systems may be utilized to provide the tactile alert. The frequency of the tactile alert can be greater than 5 Hz, and less 20 Hz, for example, between 10 Hz and 15 Hz. In other words, the frequency of the tactile alert may be a frequency that can provide the haptic effect but not be audibly heard by the one or more passengers. According to one aspect, depending on what side of the vehicle 100 (i.e., driver side 118 or co-pilot side 120) one or more objects are approaching the vehicle 100, the audio system 250 may be configured so that the tactile alert is only emitted through the front and rear left speakers 138*a*, 140*a* (i.e., driver side speakers) or only through the front and rear right speakers 138*b*, 140*b* (i.e., co-pilot side speakers), for example.

Additionally or alternatively, the body control module 230 can be configured so that the interior lighting 148 is illuminated (e.g., flashing or strobing) to provide a visual alert when an object is approaching the vehicle 100 while the vehicle 100 is at rest. Thus, according to at least one configuration, the one or more passengers can experience one or both of the tactile alert (i.e., the haptic effect) and the visual alert when an object is approaching the vehicle 100 while the vehicle 100 is at rest.

Additionally or alternatively, the body control module 230 can be configured to lock one or more of the door locks 136 of the passenger compartment doors 124, 126, 128, 130 when an object is approaching the vehicle 100 while the vehicle 100 is at rest. Thus, according to at least one configuration, if one or more of the passenger compartment doors 124, 126, 128, 130 are automatically locked when an object is approaching the vehicle 100, then the tactile alert (i.e., haptic effect) may be desirable to notify one or more of the passengers that they are temporarily being prevented from exiting the vehicle 100.

At 312, the method 300 ends.

Providing the tactile alert via the front and rear left speakers 138*a*, 140*a* or through the front and rear right speakers 138*b*, 140*b*, provides notice to one or more occupants exiting the vehicle 100 concerning the surroundings of the vehicle 100. Accordingly, providing the tactile alert through the front and rear left speakers 138*a*. 140*a* or through the front and rear right speakers 138*b*, 140*b* can help exiting occupants avoid hazards such as an animal, an approaching biker, or another object detected and/or perceived by the sensor system 240. The one or more occupants can utilize the tactile alert to time their exit from the vehicle 100 with a time when an actual or perceived hazard has past (i.e., when a biker or another vehicle has sufficiently passed the vehicle 100 to allow for safe exit from the vehicle 100).

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:
  obtaining sensor data from a vehicle sensor system of a vehicle;
  determining whether an object is approaching a rear end of the vehicle based on the sensor data;
  determining whether the vehicle is at rest based on the sensor data;
  emitting a tactile alert through an audio system if the object is detected and the vehicle is at rest, the tactile alert comprising a low-frequency signal greater than 5 Hertz (Hz) and less than 20 Hz that produces a haptic effect perceivable but inaudible by one or more occupants of the vehicle;
  selectively emitting the tactile alert through audio speakers of the audio system located on a side of the vehicle corresponding to a side from which the object is detected, thereby providing directional notification to the one or more occupants;
  selectively providing a visual alert using an interior lighting system located on the side of the vehicle corresponding to the side from which the object is detected; and
  controlling a duration of the tactile alert and the visual alert such that the alerts are provided while the object is detected as approaching or passing the rear end of the vehicle, and ceasing the alerts when the object is no longer detected, thereby indicating to the occupants when it is safe to exit the vehicle.

2. The method of claim 1, wherein obtaining sensor data from the vehicle sensor system further comprises obtaining data from one or more camera sensors of an exterior sensor subsystem.

3. The method of claim 1, wherein obtaining sensor data from the vehicle sensor system further comprises obtaining data from one or more radar sensors of an exterior sensor subsystem.

4. The method of claim 1, wherein obtaining sensor data from the vehicle sensor system further comprises obtaining data from one or more wheel speed sensors of an exterior sensor subsystem.

5. The method of claim 4, wherein determining whether the vehicle is at rest further comprises determining whether the one or more wheel speed sensors indicate that the vehicle is idling.

6. The method of claim 1, wherein determining whether the vehicle is at rest further comprises determining whether an engine control module indicates that the vehicle is in a park mode.

7. The method of claim 1, wherein providing the visual alert comprises flashing or strobing the interior lighting system.

8. The method of claim 1, further comprising automatically locking one or more door locks of passenger compartment doors when the object is detected while the vehicle is at rest.

9. The method of claim 1, wherein determining whether the vehicle is at rest comprises determining, based on wheel speed sensor data, that a wheel speed of the vehicle is zero.

10. The method of claim 1, wherein emitting the tactile alert through the audio system comprises emitting the tactile alert through both front and rear speakers located in interior door trims of the vehicle.

11. A vehicle management system of a vehicle, comprising:
  a computing system, comprising:
    data processing hardware; and
    memory hardware in communication with the data processing hardware,
  a vehicle sensor system in communication with the computing system;
  a body control module in communication with the computing system; and
  an audio system in communication with the computing system;

wherein the memory hardware stores instructions that, when executed on the data processing hardware, cause the data processing hardware to perform operations comprising:

obtaining sensor data from the vehicle sensor system;

determining whether an object is approaching a rear end of the vehicle based on the sensor data;

determining whether the vehicle is at rest based on the sensor data;

emitting a tactile alert through the audio system if the object is detected and the vehicle is at rest, the tactile alert comprising a low-frequency signal greater than 5 Hertz (Hz) and less than 20 Hz that produces a haptic effect perceivable but inaudible by one or more occupants of the vehicle;

selectively emitting the tactile alert through audio speakers of the audio system located on a side of the vehicle corresponding to a side from which the object is detected, thereby providing directional notification to the one or more occupants;

selectively providing a visual alert using an interior lighting system located on the side of the vehicle corresponding to the side from which the object is detected; and controlling a duration of the tactile alert and the visual alert such that the alerts are provided while the object is detected as approaching or passing the rear end of the vehicle, and ceasing the alerts when the object is no longer detected, thereby indicating to the occupants when it is safe to exit the vehicle.

12. The vehicle management system of claim 11, wherein obtaining sensor data from the vehicle sensor system further comprises obtaining data from one or more camera sensors of an exterior sensor subsystem.

13. The vehicle management system of claim 11, wherein obtaining sensor data from the vehicle sensor system further comprises obtaining data from one or more radar sensors of an exterior sensor subsystem.

14. The vehicle management system of claim 11, wherein obtaining sensor data from the vehicle sensor system further comprises obtaining data from one or more wheel speed sensors of an exterior sensor subsystem.

15. The vehicle management system of claim 14, wherein determining whether the vehicle is at rest further comprises determining whether the one or more wheel speed sensors indicate that the vehicle is idling.

16. The vehicle management system of claim 11, wherein determining whether the vehicle is at rest further comprises determining whether an engine control module indicates that the vehicle is in a park mode.

17. The vehicle management system of claim 11, wherein providing the visual alert comprises flashing or strobing the interior lighting system.

18. The vehicle management system of claim 11, wherein the operations further comprise automatically locking one or more door locks of passenger compartment doors when the object is detected while the vehicle is at rest.

19. The vehicle management system of claim 11, wherein determining whether the vehicle is at rest comprises determining, based on wheel speed sensor data, that a wheel speed of the vehicle is zero.

20. The vehicle management system of claim 11, wherein emitting the tactile alert through the audio system comprises emitting the tactile alert through both front and rear speakers located in interior door trims of the vehicle.

* * * * *